Sept. 2, 1969     H. HECHENLEITNER     3,464,181
APPARATUS FOR MAKING AND FILLING RECTANGULAR CONTAINERS
Filed Feb. 8, 1966     9 Sheets-Sheet 1

INVENTOR
Hans Hechenleitner
BY
Ernest J. Montague
ATTORNEY

Sept. 2, 1969  H. HECHENLEITNER  3,464,181
APPARATUS FOR MAKING AND FILLING RECTANGULAR CONTAINERS
Filed Feb. 8, 1966  9 Sheets-Sheet 5

INVENTOR.
Hans Hechenleitner
BY
Ernest Montague
attorney

Sept. 2, 1969  H. HECHENLEITNER  3,464,181
APPARATUS FOR MAKING AND FILLING RECTANGULAR CONTAINERS
Filed Feb. 8, 1966  9 Sheets-Sheet 8

INVENTOR.
Hans Hechenleitner
BY
Ernest Montague
Attorney

United States Patent Office 3,464,181
Patented Sept. 2, 1969

3,464,181
APPARATUS FOR MAKING AND FILLING RECTANGULAR CONTAINERS
Hans Hechenleitner, Villach, Austria, assignor to Hechenleitner & Cie, Villach, Austria, a corporation of Austria
Filed Feb. 8, 1966, Ser. No. 525,953
Claims priority, application Austria, Feb. 9, 1965,
A 1,143/65
Int. Cl. B65b 3/02, 9/12
U.S. Cl. 53—180
18 Claims

ABSTRACT OF THE DISCLOSURE

An apparatus for making and filling rectangular containers comprising a pair of grooved rolls arranged after a delivery roll for forming longitudinal folding lines for the top and bottom edges, a stamping means for stamping transverse folding lines drawing off a length of the strip from the delivery roll during stamping, welding means for a longitudinal seam of the tube on the side walls, a folding device for forming square containers, means for separating the containers while the open stamping means is returned to its original position, a slide operable to push the separated container to a finishing device, interacting ribs on the grooved rolls performing a longitudinal groove in the central fold edge as well as folding lines for the longitudinal seam of the tube, a guide roll diagonally arranged relative to the delivery roll by 90° after the pair of grooved rolls, a distance of several tubular lengths being provided between the welding means for the longitudinal seam of the tube and a tubular jacket having a flat hexagonal cross-section symmetrical along two axes arranged between the welding means and two support walls arranged for folding the container under the welding device dies for the side wall seams which dies are horizontally movable, and a moulding die and plate are pivotally connected between the support walls on each side if the tubular part and are movable against the latter and against the welding dies on circular tracks.

The present invention relates to a method of and apparatus for making and filling rectangular containers, in general, and to an apparatus for making and filling rectangular containers, suitable for containing fluids, the container being produced from a strip of material which is appropriately coated on one or both sides and which forms a tube and if desired has a tear-off opening in one of the upper end flaps, in particular.

It is one object of the present invention to provide an apparatus for making and filling rectangular containers wherein this opening renders it possible to make and fill in continuous steps, a container wherein the fold edge of the material strip, folded together to form the tube, is located in the base of the container and all seams are formed by welding the superimposed inner sides of the strip.

It is another object of the present invention to provide an apparatus for making and filling rectangular containers wherein the container shall have no seam at its base, whereby the base is sealed and any fluid contents cannot leak out. Since in this container all seams are formed by welding the superimposed inner sides of the material strip, the filling material comes into contact only with the inner side of the strip. Therefore there is no danger of the filling material being contaminated. Such a danger exists, in known containers, where the outside is welded to the inside in order to form the tube and the edge of the material strip comes into contact with the filling material. The inner sides of the container of the present invention are practically free from contagion, since after the folding action in the next operation, the adjacent inner sides of the folded material strip or the inner sides of the container no longer comes into contact with the outer environment, but only with the filling material. The actual strip of material is coated with a plastics material at about 250° C., and subsequently immediately rolled up; and is to a high degree sterile. Should for any particular reason a higher sterilization be desired to be achieved, then the inner side of the strip can, before the folding action, be treated with an antiseptic medium, e.g. hydrogen peroxide, and during the folding action, can be blasted with hot air, so that the antiseptic medium can evaporate.

It is another object of the present invention to provide an apparatus for making and filling rectangular containers wherein the strip of material taken from a roll, in continuous steps, is provided with longitudinal grooves and a reinforced longitudinal groove in the center of the strip along the folding lines for the edges of the cover and base as well as for the seams of the container, and is folded along the strip, so that both halves of the sides of the strip forming the inner sides of the container are located side by side, whereupon the folding lines for the side edges and the end flaps of the container are stamped by means of a stamping device, and the edges of the strip are welded at a distance from the stamping device in order to form a tube, and the seam is reversed. The end of the tube is welded and the tubular part thus formed is filled by means of a filling tube inserted into the tubular part in front of the device for welding the edges of the strip, with the filling material to be packed at a height of about two or three lengths of a tube section and the filled tubular part is moulded and welded transversely in order to form a prismatic container body, while avoiding any inclusions of air. The closed packing is separated from the tube by a cut made in the center of the seam, whereupon triangular end flaps are automatically formed in a manner known per se by folding in the side walls, and these flaps are reversed and are securely held to the base and to the cover, e.g. by gluing.

According to the invention, for forming packets composed of a plurality of separable containers, the latter can be connected together by means of strips which are glued or welded over the end flaps and the strips can be perforated in the contact planes of the containers. A further feature of the invention consists in that the layers of material of one of the shaped end flaps can be welded over the surface of an equal-sided, preferably right angled triangle, whose base line is located on one edge of the end flap, and notches are cut in the welded surface at a distance fro mthe sides of the triangle, for forming a tear-off opening, the notches terminating at a distance from one another.

It is yet another object of the present invention to provide an apparatus for making and filling rectangular containers comprising a pair of grooved rollers arranged after a delivery roller for the material strip in a manner known per se, for longitudinally grooving the central folding edge, the folding lines for the top and the bottom edges as well as for the longitudinal seam of the tube, and following this is a guide roller located at 90° to the delivery roller and a stamping device for stamping the folding lines for the side edges and end flaps as well as for stamping the seams located on the side walls, this device pulling a length of the folded material from the delivery roller during the stamping action, while the following welding apparatus for the longitudinal seam of the tube and the seams located on the side walls, a folding device for forming the rectangular shape of the container as well as a separating apparatus during the withdrawal of the open stamping device into its original position and a slide for pushing down the separated containers to a final finishing apparatus, are operable as the strip of material is being transported. By means of the gripping connection of the stamp die with the material strip during the stamping action, in apparatus according to the invention, an absolutely exact advance movement of the material is guaranteed.

In contrast to known containers which are filled individually, the filling material is inserted into the shaped tube over a length of several sections and the containers are formed from the filled tubes. To this end, in a machine according to the invention, and according to a further feature of the invention, a distance of several lengths of tubular section are provided between the welding devices for the longitudinal seam of the tube and that for the side wall seams, so that the tube can be filled between these welding devices, the open end of said tube being closed at the beginning of the operation by the side seam-welding device. In order that the tube assumes no shapeless form by means of the filling, according to the invention a tubular casing can be arranged between the two welding devices, preferably between the end position of the stamping device and the side seam welding device, in which casing the tube is guided. The casing has a flat hexagonal cross section which is symmetrical along two axes, whereby the tube is preshaped by means of the filling material for the following folding to form the container. The casing is provided on one of its narrow sides with a continuous slot, through which the adjacent edges of the folded width of material project in front of the longitudinal seam-welding device and through which the longitudinal seam of the tube projects after said welding device. The filling of the tube with the filling material is effected according to the invention through a filling tube, which is inserted in front of the longitudinal seam-welding device through a widened opening on the slot side of the casing between the edges of the material which are still unwelded and which projects into the tube. In order that the filling tube does not contact and contaminate the clean inner sides of the material strip, the filling tube has according to a feature of the invention, a longitudinally oval cross section and is so inserted into the material strip that its longitudinal sides are located parallel to the edges of the width. Furthermore, the inner sides are held at a distance from one another and from the filling tube by pressing the folded width onto the side of the folded edge. To this end, the casing has another opening on the narrow side located opposite the slot at the same height as the opening, in which a roller is arranged which presses the strip of material. In order that the container as a whole contains only the filling material without any inclusions of air, the container is advantageously shaped before the seam of the side wall is welded. According to the invention, the dies of the welding device are separated from one another by a distance of 3 to 5 mm. during the shaping process. By means of the folding of the container and formation of its end flaps, the excess of filling material is pressed back between the welding dies into the tube. Due to the particular construction of the welding electrodes, inclusions of filling material between the welded side seams are avoided.

With these and other objects in view, which will become apparent in the following detailed description, the present invention will be clearly understood in connection with the accompanying drawings, in which.

Figure 1:
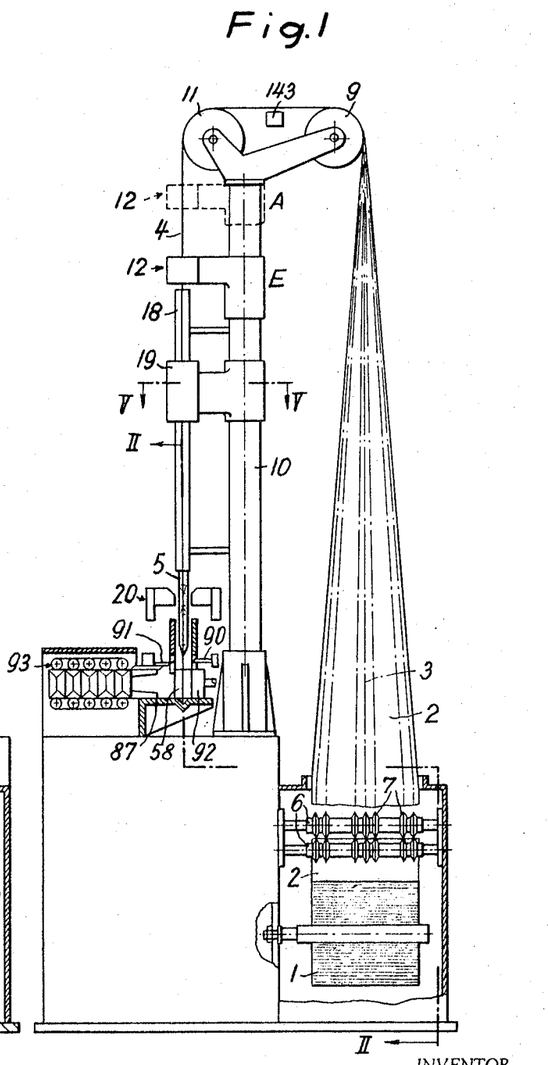
FIGURE 1 is a front elevational view of an apparatus for making and filling rectangular containers.
Figure 2:
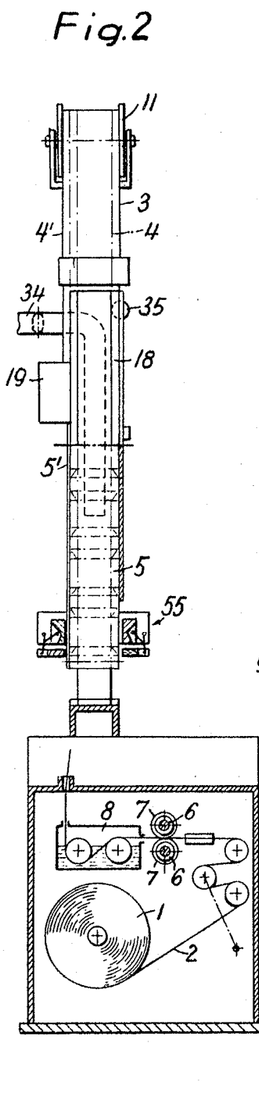
FIGURE 2 is a section along the lines II—II of FIG. 1.

Referring now to the drawings, in the machine according to FIGS. 1 and 2, the working operations are successively effected in a vertical direction in continuous steps, namely the strip of material 2 taken from a delivery roller 1 is folded during the upward movement along a central fold line 3, and during the downward movement a tube 5 is formed, filled and folded to form containers from the folded material strip 4 and the containers are closed and finally shaped. In order that the method of manufacture during the preparation of the delivery roll in the machine can be continued without any material interruption, apart from the delivery roll, a second delivery roll (not shown) is prepared, whose width is welded to the end of the consumed strip of material, e.g. by the impulse process.

The strip of material passes immediately after the delivery roll 1, between two die rolls 6 having a plurality of stamping rings 7, whose central stamping rings form a groove on the folding edge 3 and whose other stamping rings form a groove on the fold lines of the top and bottom edges and on those of the longitudinal seams of the tube. In order to prevent a run during the folding of the width of material, the fold line 3 retains a stronger stamping than the folding lines. After the stamping rolls, the width of material passes through a tank 8, which contains an antiseptic means for sterilizing the strip. Above the delivery roll 1 there is provided a guide roll 9 which effects the folding by the vertical arrangement of its axis to that of the delivery roll.

The delivery roll, the stamping roll and the guide roll are arranged on one side of a column 10, at which the material strip is guided upwardly.

Figure 3:
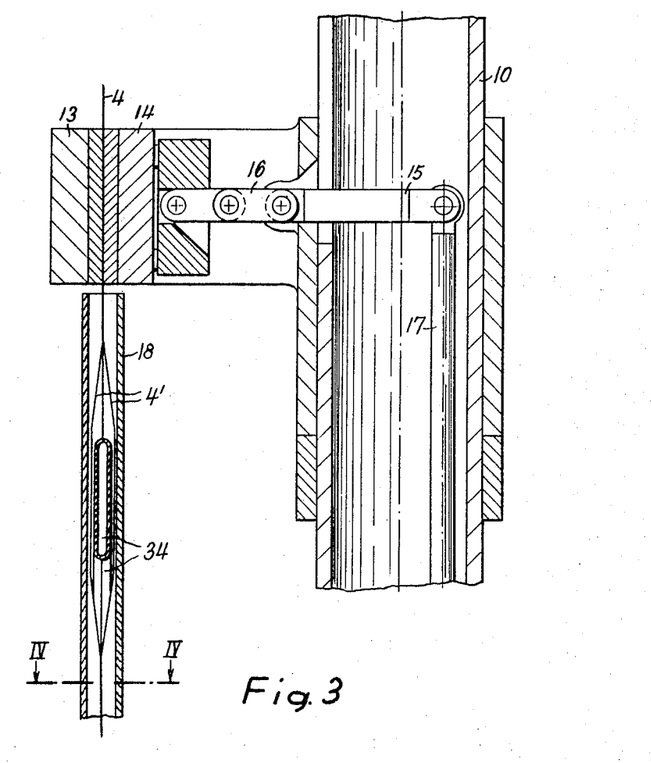
FIG. 3 illustrates the stamping device in longitudinal section.

A guide roll 11 parallel to the guide roll 9 leads this material to the other side of the column in a downward direction to a stamping device 12, which stamps the folding lines in order to form the side edges, end flaps and seams on the side walls. The device is movably located on the column and, corresponding to the working cycle, is moved downwardly when in closed condition or inversely upwardly when in opened condition, from its original position A indicated in FIG. 1 by broken lines along a section length into the final position E. Stamping is subsequently effected during the downward movement, whereby the material strip is simultaneously drawn and transported from the delivery roll over a section length. according to FIG. 3, the stamping device has on both sides of the folded width 4 a die stamp 13 or 14, the stamp 13 being securely fixed with respect to the stamp 14 and the stamp 14 being movable by means of hinged bars 15, 16, against the stamp 13. The bars are adjusted by means of a hinged rod 17, which also operates the upward or downward movement of the device. This rod is controlled by a drive motor (not shown) and a cam disc driven by the driving motor.

Figure 4:
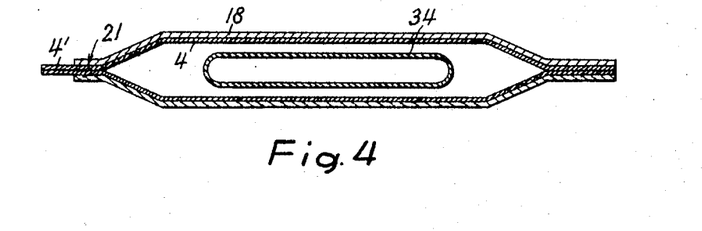
FIG. 4 is a section along the lines IV—IV of FIG. 3.
Figure 5:
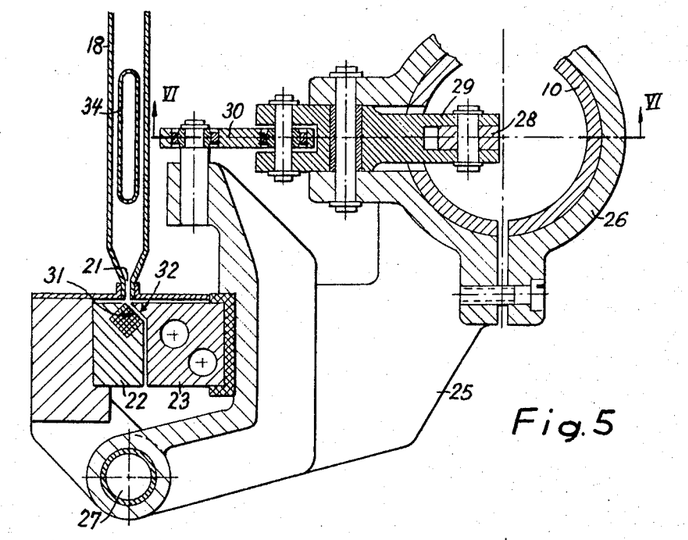
FIG. 5 is a section of the welding device for the tubular seam in connection with the casing along the lines V—V of FIGURE 1.
Figure 6:
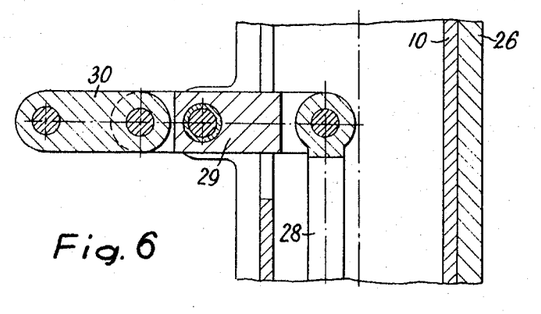
FIG. 6 is a section along the lines VI—VI of FIG. 5.

The stamped strip enters into a tubular jacket 18 secured to the column, the jacket being arranged near a welding device 19 for producing the longitudinal seam of the tube 5 (FIG. 1) and its inlet being located directly beneath the final position of the stamping device and its outlet being located above a device 20 for welding the side wall seam. As FIGS. 4 and 5 show, the guide jacket has a flat hexagonal cross section which is symmetrical along two axes. On one narrow side, the jacket is provided with a continuous slot 21, through which the edges 4' of the folded strip 4 project above the welding device 19 and through which the welded longitudinal seam 5' of the tube 5 projects below the welding device (FIG. 2). Between the welding devices 19 and 20 there is provided a distance of several lengths, in order that the tube can be filled to a level corresponding to the desired aim. The welding device 19 of FIGS. 5 and 6 is so provided on the slot side of the jacket that the edges of the material (which are not shown for reasons of clarity) and which project through the slot 21 are located between their heated dies 22, 23. One die 22 is secured via an arm 25 and a three-part sleeve, 26 to the column 10 whereas the other die 23 is pivotable about an axis 27 by means of hinge rods 29, 30 which are adjustable by means of a lever 28, against the die 22. The welding areas 31, 32 of both dies are arranged to be diagonal, at an approximate angle of 135°, to the central plane of the jacket 18. An intermediate position is thereby given to the welded longitudinal seam of the tube, this position simplifying the complete folding of the seam during a following working cycle. The welding dies or areas, which are appropriately of a larger length than the longitudinal edge of the base of the container, are open during the advance movement of the material strip and close when the stamping device, when in opened condition, returns into the original upper position.

Figure 7:
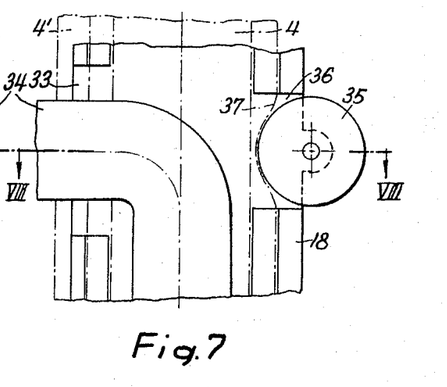
FIG. 7 illustrates the insertion of the filling tube into the casing shown in longitudinal section.
Figure 8:
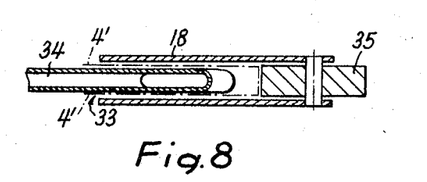
FIG. 8 is a section along the lines VII—VII of FIG. 7.

Above the welding device 19 there is introduced according to FIGS. 2, 7 and 8 a filling tube 34 for conveying the filling material into the tube 5, through an opening 33 on the slot side of the jacket between the still open edges 4' of the folded strip 4. The filling tube having a flat oval cross-section penetrates the edges of the strip so that its longitudinal walls are parallel to the edges thereof, so that the width of the column between the edges is very small. A roll 35 prevents the clean inner sides of the mtaerial strip being applied to the filling tube 34, as shown in FIGS. 7 and 8. This projects through an opening 36 provided on the narrow side located opposite the slot side, into the jacket 18 and presses the strip 4, shown dotted, on the side 37 of the fold edge, whereby the inner sides of the strip, as may be seen from FIG. 8, are held at a distance from one another and from the filling tube. In order, if necessary, to remove the remainder of the antiseptic means remaining on the inside of the strip, another conduit (not shown) can be provided above or below the filling tube for blowing in hot air. Of course, the filling material can only be conveyed when the welding device 19 has welded the open end of the tube 5.

Figure 9:
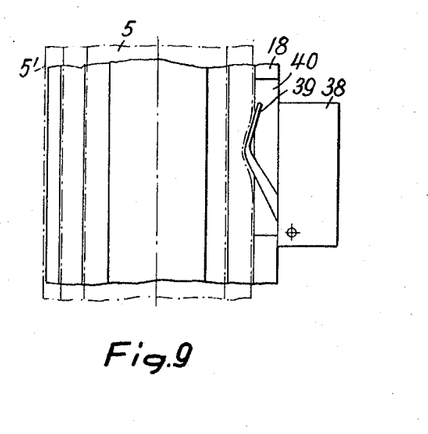
FIGS. 9 and 11 illustrate the apparatus for regulating the inflow of the filling material, FIGURE 9 showing the feed control lever and FIGURES 10 and 11 a side and front view respectively of the gluing device.
Figure 10:
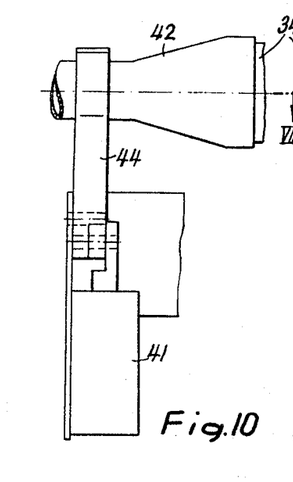
Figure 11:
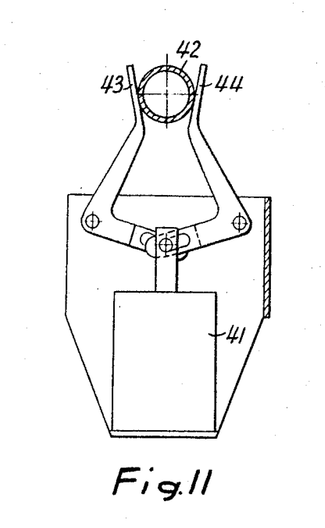

It is also advantageous to provide a regulating device for the inflow of the filling material, which device prevents the further inflow of the filling material when an admissible level has been reached. This device shown in FIGS. 9 to 11 has a feed control lever 39 cooperating with a switch 38, the lever control operating through a recess 40 in the guide jacket 18 gripping the tube 5 and being pressed downwardly by the wall of the tube, when the rising filling material bulges out at the position of the tube pressed in by the feed control lever. While deflecting, it actuates the switch, which switches on a magnet 41 of a clamping device. The clamping device according to FIGS. 10 and 11 is arranged in front of the jacket 18. It regulates the flow of the filling material by pressing together and elastic tubular part 42 of the filling tube 34 consisting for example of tetrafluorethyl-type polymers such as polytetrafluorethylene. The clamping device has two clamping levers 43, 44, which are mutually movable by the magnet 41 for clamping the tubular part 42 located therebetween.

Figure 12:
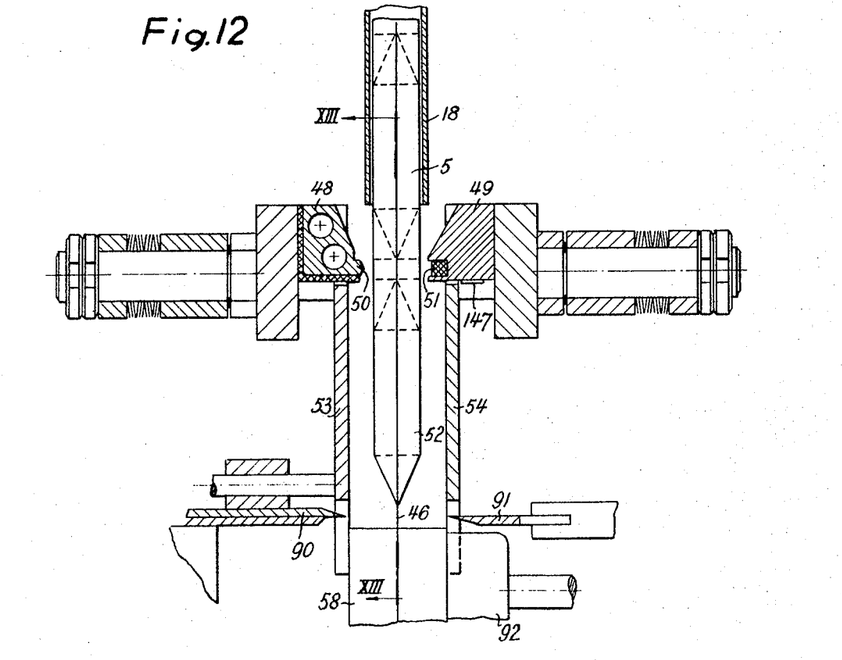
FIG. 12 shows the welding device for the side seams in longitudinal section.
Figure 13:
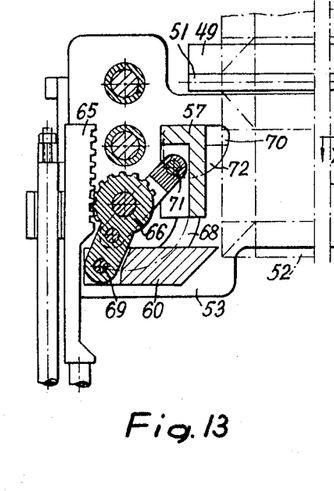
FIGS. 13 and 14 and FIGS. 17 and 18 are sections along the lines XIII—XIII of FIG. 12 or XVII—XVII of FIG. 15 of half of the folding device in open or closed position.
Figure 14:
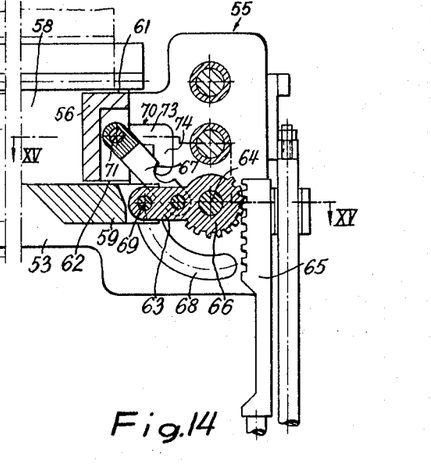

The welding device 20 according to FIG. 12 welds a seam 46 diagonally to the tube 5, said seam 46 having double the breadth of a side seam of the containers, because the seam belongs half to the already folded container 58 hanging below the welding device and half to the tubular section 52 located thereabove (FIG. 13). The welding device is therefore provided with two welding dies 48, 49, whose welding electrodes 50, 51 are of a breadth which corresponds to double the breadth of the seam. The welding electrode 50 has two inclined surfaces with an obtuse angle therebetween, in order that when the welding dies are being pushed together, the filling material, in particular wetting residues, can be pressed out more easily from the welding area. Before welding, while the stamping device is open, the electrodes 50, 51 are pushed together until they are 4 or 5 mm. apart and the prismatic form of the container is shaped. The still hexagonal tubular part 52 hanging beneath the welding dies, is located, before the dies are pushed together, between two support walls 53, 54 provided below the welding device 20 (FIGS. 12 to 15), the supporting walls being separated by the width of one container, and on which the wide walls of the container lie along their fold.

The device 55 for shaping or folding the square container has, according to FIGS. 13 to 18, two moulding dies 56, 57 movable against the walls of the tubular sections 52 forming the top and bottom, diagonally downwardly between the supporting walls 53, 54 (FIG. 15), for pressing the top and bottom up, whereby the rectangular or square cross section of the container 58 is shiped between the support walls and the moulding dies. At the same time, with every moulding die, a moulding plate 59 or 60 is pressed against the narrow walls of the tubular section turned away from the welding dies 48, 49, so that the latter section is raised and pressed by the dies and plates against the welding dies. The moulding dies shape the end flaps 61 or 62 while the top and bottom are being flattened, one of the end flaps being pressed between the moulding dies and the welding dies and the other end flap being pressed between the moulding dies and the moulding plates.

The moulding dies and moulding plates are operated by levers 63, which are rotatable about axes 64 located in the supporting walls 53, 54. Each of these levers is moved by a toothed rack 65, which is engaged with its boss 66 formed as a pinion. At the end of the lever is pivoted the moulding plate and in its center a hinged plate 67 which is pivotally connected with the moulding die. The moulding dies as well as the moulding plates are lifted, for folding the container, from below onto circular tracks against the tubular section and the moulding dies are lifted from the shaped container after being folded vertically to the operational direction of the machine. For controlling these movements, circular slots 68 are provided in the support walls for guiding the pin 69 connecting the moulding plate and the lever 63 and recesses 70 are provided for guiding the pin 71 connecting the moulding die and the hinged plate. 67. The recesses 70 have the form of a rectangular circular sector, the curved sides of the recesses of each support wall facing one another and the straight sides being arranged vertically or parallel to the operational movement of the machine. For folding the container, the pins 69 move in the slots 68 and the pins 71 along the curved sides of the recesses 70. After the folding or welding operation of the side seam of the container, the pins 71 are returned along the vertical and then along the parallel sides into the original position. This movement is effected by latches 72 (FIGS. 15 and 16), which are arranged on the outside of one support wall 53. They have side surfaces parallel to the straight sides of the recesses, gaps 73, 74 being left between said side surfaces and the sides, the breath of said gaps being equal to the diameter of the pin 71. While the pins are being led into the folding position, the latches which are pivotally connected with the support wall are pressed downwardly by the ends of the pin projecting beyond the support wall, against the pressure of springs 71, so that they do not disturb the movement of the pins along the curved sides. However, as soon as the pins have reached the end of the curved sides, where the moulding dies are in folded position, the latches are again connected with the support wall with the aid of the springs 75. By reversing the toothed rack 65, the levers 63 are moved back and the pins 71 slide into the gaps 73 for vertically lifting the dies 56, 57 up to the parallel gaps 74 and in the latter into the opening position, while the pins 69 are returned back into the circular slots 68.

Figure 15:
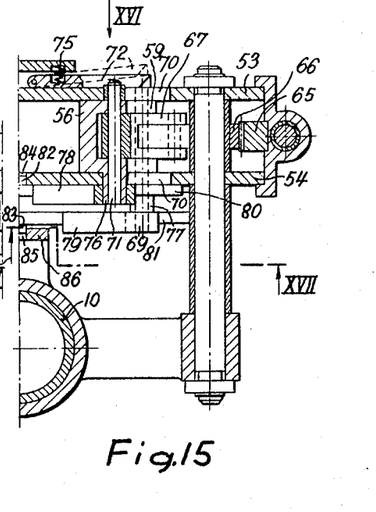
FIG. 15 is a section along the lines XV—XV in FIG. 14.
Figure 16:
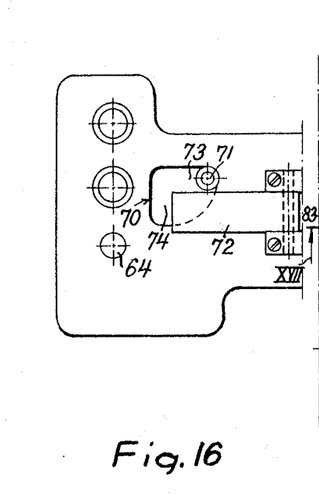
FIG. 16 is a view of one half of the device in the direction of the arrow XVI of FIG. 15.
Figure 17:
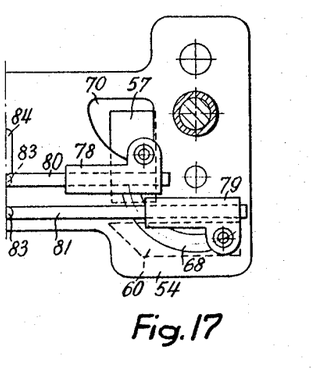
Figure 18:
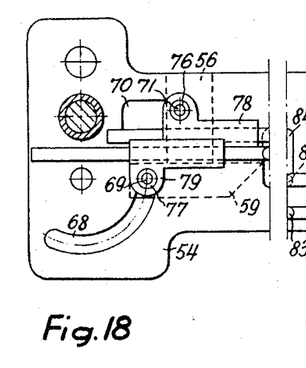

In order that the moulding dies and the moulding plates retain the position necessary for shaping the container during its movement and that they cannot tilt about their pins 69, 71, sleeves 76, 77 enclosing the pins are applied to the pins 69, 71 as may be seen from FIGS. 15, 17 and 18, these sleeves projecting through the slots and recesses of the support wall 54 and beyond the latter. The sleeves are coupled with bars 78, 79, which are arranged to slide on rails 80, 81 which run transversely to the operative direction of the machine and parallel to the latter. During the upward movement of the dies and plates, the bars move towards one another and the rails simultaneously move upwards, during the downward movement of the dies and plates, the movements are effected in opposite directions. For guiding the rails parallel to the operative direction of the machine, said rails have pins 82, 83, one of which engages in a slot 84 of the support wall and the other engages in a slot 85 of a plate 86 arranged on the column 10.

When the moulding dies and plates form the tubular section for the container, the excess filling material is pressed back into the tube 5 through the aperture in the tube between the welding electrodes 50, 51 which are not yet completely closed. For ensuring the prescribed volume, stops (not shown) are provided which are ensured against unauthorized displacement, e.g. by sealing, the stops separating the moulding dies and plates by the correct distance corresponding to the desired container dimensions. By folding the tube for the container by means of the folding dies and plates, the welding electrodes simultaneously being separated from one another by a small distance, a slight vacuum arises during the folding, so that the filling of the container can advantageously take place without any inclusion of air. Now the welding electrodes 50, 51 close and weld the double seam as well as the inside of an upper end flap in the form of an equal sided, preferably a right-angled triangle with the base line located on the edge of the flap. To this end, the welding die 49 is provided on its lower side with a welding electrode 147 and the associated moulding die is provided with a flexible base (not shown) (FIG. 2). While the welding electrodes are being opened, the moulding dies and plates move back into their lower position.

Figure 19:
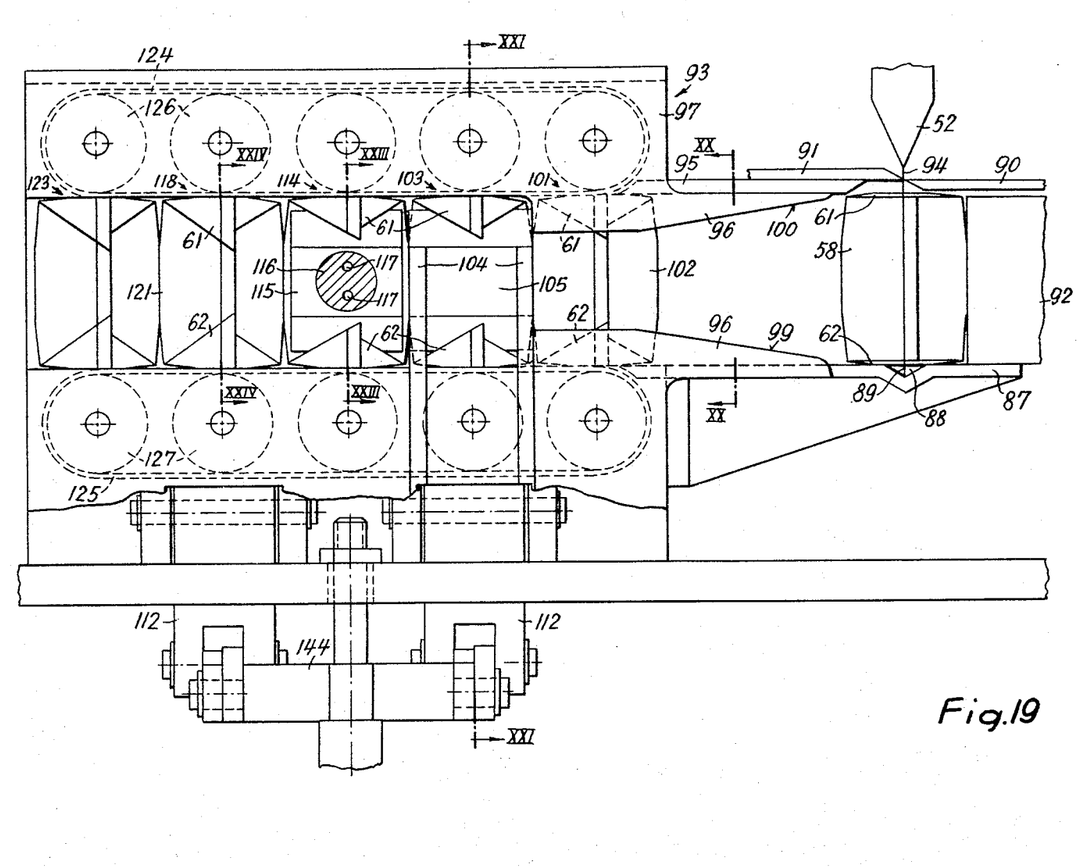
FIG. 19 is a plan view of the final finishing device.

Now the stamps of the stamping device are closed and the latter moves downwardly, whereby the strip of material is tightened up by the length of a tube and the folded and closed container 58 is dropped onto a table 87 (FIGS. 1, 12 and 19). The table is provided with a transverse slot 88, into which project the not yet reversed welding seam 89 of the lower side wall of the set-up container 58. Now the container is separated from the following tubular section 52 hanging beneath the welding device 20, by means of two cutters 90, 91 actuated by mechanical gears (not shown).

Subsequently, a slide 92 pressing against the wide side of the container moves the latter to a final manufacturing device 93 provided diagonally to the column 10, according to FIGS. 1, 19 to 24, in which folding and gluing is effected at several stations. For reasons of clarity, the parts of the device arranged in front of said device are not shown in FIG. 19.

Figures 20, 22, 23:
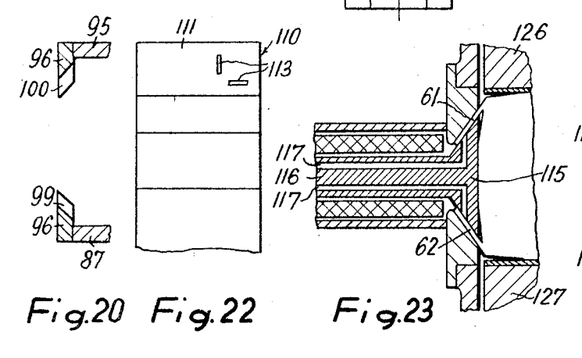
FIGS. 20–24 show individual parts of the apparatus.
Figure 21:
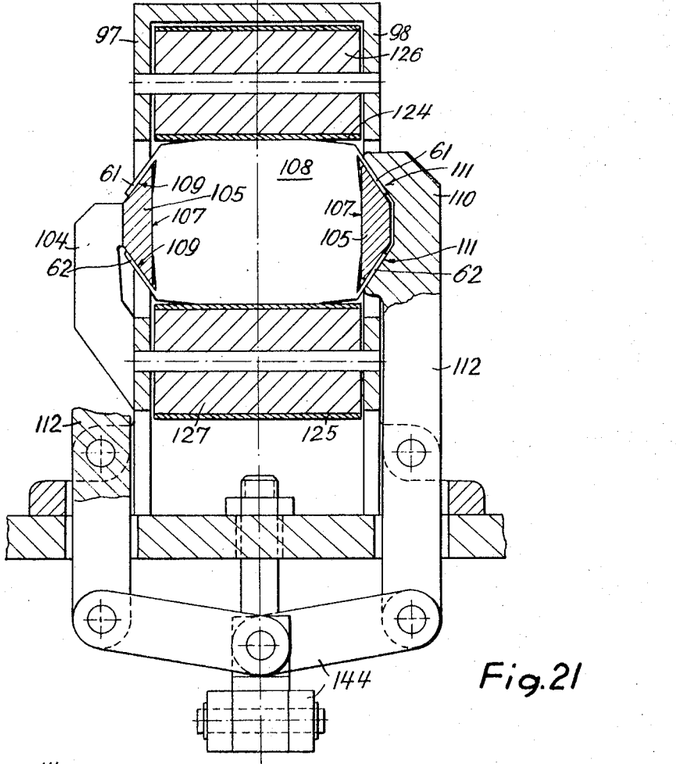
Figure 24:
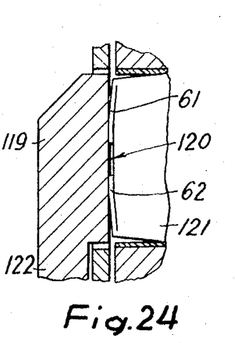

The container is guided on the way to said device constructed similarly with regard to its longitudinal central plane, for reversing the welding seam 89, 94 on the side walls between the table 87 and a plate 95 provided thereabove and for folding the end flaps 61, 62 between two pairs of guide rails 96 arranged on the side of the top and bottom of the container, said guide rails being attached to the side walls 97, 98 (FIGS. 19 and 20). Each pair of guide rails has, as FIG. 20 illustrating a section along the line XX—XX of FIG. 19 shows, a top and bottom guide rail having an edge 99, 100, both edges converging towards the device 93. The end flaps which, during the advance movement of the container, lead up to the first finishing station 101, are curved down by the edges 99, 100 against the top and bottom. In the first station 101, in which the guide edges are parallel to one another, the end flaps form an angle of about 20° with the top and bottom of the container 102. In the second finishing station 103, the end flaps are pressed together (FIGS. 19 and 21). Base plates 105 are securely connected with the walls 97, 98 by means of arms 104, said plates being of trapezoidal cross-section and the top and bottom of the interposed container 108 are located on their largest parallel surfaces 107 and the end flaps 61, 62 are located on their inclined surfaces 109. Pressure plates 110 may be pressed against both base plates or against the supported end flaps, said pressure plates being provided with pressure surfaces 111 adapted to the inclined surfaces of the base plates. The pressure plates are arranged on the ends of levers 112 which are pivotable by means of a mechanical gear 144, the gear being controlled like that of the other devices by a cam disc (not shown). While the end flaps are being pressed together, the notches are produced at the same time for the tear-off opening, for which in the welding device 20, the parts of one end flap were welded partly in the form of an equal sides, right-angled triangle. As may be seen from FIG. 22, two drawknives 113 are provided on the corresponding pressure surface 111 of one of the pressure plates 112, which drawknives are arranged vertically to one another corresponding to the notches to be cut and terminate at a distance from one another, the corresponding grooves being arranged in the associated base plates. The end flaps are supported on base plates 115 also in the third finishing station 114, which base plates have the same cross-section as that of the second station. They are heated and held according to FIGS. 19 and 23 in their position by arms 116. Each of these arms is connected with an extruder (not shown), which conveys adhesive material to the lower sides of the upper end lower end flaps through channels 117 provided in the arms. The fourth station 118 has two pivotable pressure plates 119 with flat pressure surfaces 120 according to FIG. 24, whose task it is to press the end flaps 61, 62 provided with adhesive on the top and bottom of the container 121. These pressure plates are arranged, like the pressure plates 111 of the second station, on ends of levers 122, which are appropriately pivotable in the same way with the levers 112. The container remains in the fifth station 123 for drying the adhesive. The containers, connected in successive rows, pass through the final finishing device between two endless belts 124, 125 located on the container side walls. These bands pass over rollers 126, 127, which are located in the side walls 97, 98, namely in the transverse central plane of each station. They hold the containers in shape during the finishing process together with the guide rails, base plates and pressure plates.

Figure 25:
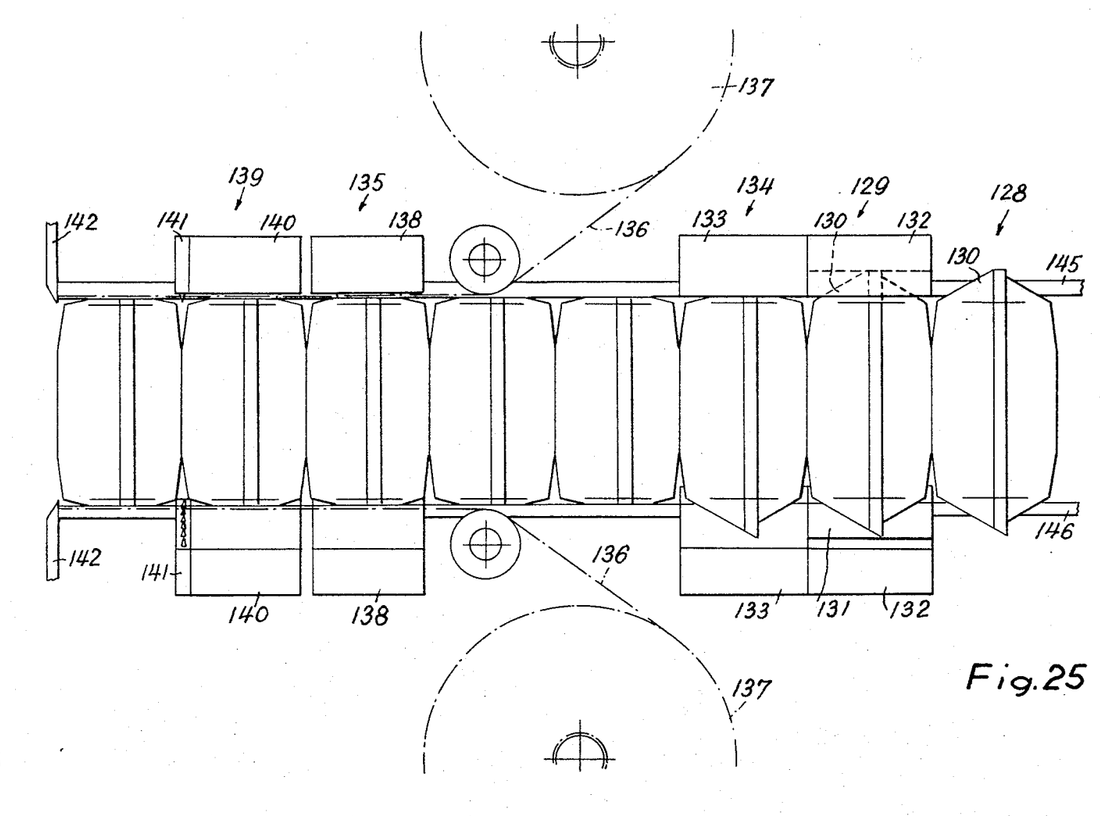
FIG. 25 is a plan view of a modified embodiment of the final finishing device.

A modified construction of the final finishing device, which makes possible the production of packets from several containers, is shown in plan view in FIG. 25, the upper endless belt being left out for reason of clarity. The movable parts of the device are shown on one side in closed position and on the other side in opened position. Firstly, in the first two stations 128, 129, the end flaps 130 of the containers are bent downwardly by the pairs of guide rails 145, 146 and are pressed together between the base plates 131 and the pressure plates 132 as in the first two stations of the device according to FIGURES 19 to 24. After pivotable pressure plates 133 having flat pressure surfaces in the third station 134 having applied the end flaps to the top and bottom of the container, in the fourth station 135, strips of paper 136 coated with plastics material are glued to the end flaps. The strips of paper which are drawn from the delivery drums 137 and which are shown in dotted lines, are heated by heated pressure plates 138 having flat pressure surfaces and are pressed on the end flaps. Other pressure plates 140 which are provided in the fifth station 139 and appropriately pivotable together with the pressure plates of the other stations, press the strips again onto the end flaps whilst the adhesive is drying. More ridges 141 having spikes are arranged laterally to said pressure plates, these spikes serving to perforate the strips in the contact planes of the containers, in order that each container can be individually separated from the packet. Cutters 142 are provided at the end of the final finishing device, which cut through the strips after the last container of a shaped packet.

The movable elements of the devices of the machines are actuated for the individual working processes, as has already been explained above, by means of mechanical gears, which are controlled by cam discs driven by the driving motor. The different devices could however also be actuated hydraulically, the driving motor actuating valves via cam discs, said valves supplying the different working cylinders with hydraulic fluid. When using printed strips, a photoelectric cell 143 can be arranged between the guide rollers 9 and 11 of FIG. 1 for adapting the advance movement to the pressure for the individual containers, said photoelectric cell scanning register marks on the material and appropriately controlling the driving motor, as is well known in the art. The different weldings can be carried out not only in the hot contact process but also in the impulse or ultrasonic process.

While I have disclosed several embodiments of the present invention, it is to be understood that these embodiments are given by example only and not in a limiting sense, the scope of the present invention being determined by the objects and the claims.

I claim:

1. An apparatus for making and filling a rectangular container particularly suitable for containing fluids, which is produced from a strip of material coated on at least one side and which forms a tube, and preferably having in one of the upper end flaps a tear-off opening, comprising
   a delivery roll means for the strip of material,
   a pair of grooved rolls arranged after said delivery roll means for forming longitudinal folding lines for top top and bottom edges,
   a stamping means for stamping transverse folding lines lines and drawing off a length of the folded strip from said delivery roll means during stamping,
   first welding means for welding a longitudinal seam of the tube,
   second welding means for welding transverse side wall seams,
   a folding means for forming square containers,
   means for separating said containers,
   means for returning the open stamping means into its original condition while said separating means is operative,
   a final finishing device,
   a slide means for pushing the separated containers to said final finishing device while said strip is being transported,
   interacting ribs provided on said pair of grooved rolls for forming a longitudinal groove in the central fold edge as well as folding lines for the longitudinal seam of said tube,
   a guide roll diagonally arranged after said pair of grooved rolls and oriented relative to said delivery roll by 90°,
   said welding means for the longitudinal seam of the tube being spaced a distance of several package lengths from said transverse welding means,
   a tubular jacket means having a flat hexagonal cross-section symmetrical along two axes and arranged between said first welding means and said second welding means,
   said second welding means including dies being horizontally movable,
   two support walls arranged at a distance of the width of a container for folding the latter under said dies of said welding means for the side wall seams,
   circular tracks,
   a moulding die, and
   a moulding plate connected pivotally with said moulding die and provided between said support walls on each side of the tubular portion and adapted to be moved against said tubular portion and against said welding dies on said circular tracks.

2. The apparatus as set forth in claim 1, wherein
   said tubular jacket means is disposed between the final position of said stamping means and said welding means for said side wall seams, and
   said tubular jacket means includes a narrow side facing said dies of said welding means for said longitudinal seam and having a continuous slot adapted for the edges of said strip of the longitudinal seam of said tube to project therethrough.

3. The apparatus as set forth in claim 2, wherein
   said tubular jacket means has a first aperture on the side defining said slot above said welding means for the longitudinal seam of the tube, and
   a filling tube guided through said first aperture between said edges of the folded strip projecting into said tube.

4. The apparatus as set forth in claim 3, wherein
   said filling tube has a oval cross-section and longitudinal walls parallel to said edges of the strip of material.

5. The apparatus as set forth in claim 3, wherein
   said tubular jacket means includes a second aperture on a second narrow side located opposite said slot, on the level of said first aperture for the filling tube, and
   a roll is arranged in said second aperture pressing in the material strip.

6. The apparatus as set forth in claim 1, further comprising
   a pivotable feed control lever guided through said tubular jacket means located on the tube,
   an adjusting means,
   a magnet means including a switch for switching on said adjusting means, and
   said feed control lever adapted to be pivotable by the filling material rising in the tube and adapted to actuate said magnet means via said switch.

7. The apparatus as set forth in claim 6, wherein
   said filling tube includes an elastic tubular part consisting of a polymer of the tetrafluoroethyl-type,
   said tubular part cooperating with said adjusting means, the latter including two levers actuated by said magnet and gripping said elastic tubular part.

8. The apparatus as set forth in claim 1, wherein
   said dies of said first welding means include welding surfaces which weld the edges of said strip projecting from said tubular jacket means, and which extend at an angle of approximately 135° to the longitudinal central plane of said tubular jacket means.

9. The apparatus as set forth in claim 1, wherein
   said dies of the welding means for the side wall seams includes welding electrodes having a width double the width of a seam, and means for operating said dies to approach one another firstly to a separation of 3 to 5 mm. and to remain in this position while the container is being folded.

10. The apparatus as set forth in claim 1, further comprising a lever having a boss formed to constitute a rotatable pinion, a toothed rack means for rotating said rotatable pinion and located in the support walls for operating each moulding die and the corresponding moulding plate, a hinged plate articulating said lever to said moulding die, each support having a circular slot and a recess in the form of a right angled circular sector, a first pin means for connecting said lever and said moulding plate guided in said circular slots, and a second pin means connecting said hinged plates and the moulding dies guided along the sides of said recesses in their movement of the tubular portion and from the folded container.

11. The apparatus as set forth in claim 10, further comprising latches pivotally arranged on the outside of one of said support walls, said latches partially covering said recesses of the wall, so that vertical and parallel gaps are provided having a width equal to the diameter of said second pin means connecting said hinged plates and said moulding dies between the straight sides of said recesses and the sides of said latches in the operating direction of said apparatus, said second pin means project beyond the support wall, springs disposed on said support wall, said latches adapted to press down against the pressure of said springs from the support wall in their movement to the tubular portion along the curved sides of said recesses, until they reach the vertical gaps, and said latches adapted to come to rest again on said support wall, while the second pin means are guided in the vertical and parallel gap while the dies are being returned.

12. The apparatus as set forth in claim 11, further comprising sleeves in which are arranged said moulding dies and said moulding plates and enclosing said first and second pin means, said sleeves project through said circular slots and recesses respectively beyond said other support wall, bars securely fixed to said projecting sleeves, said moulding dies and said plates including moulding bars, a rail provided transversely to the operating direction of said apparatus, said rails being guided in the operating direction of said apparatus, and said moulding bars slidingly disposed on said rails.

13. The apparatus as set forth in claim 9, further comprising a welding electrode on the lower side of one of said dies of said welding means for the side wall seams, and a flexible base means on the top side of said moulding die for operating against said die.

14. The apparatus as set forth in claim 1, wherein said means for separating said containers comprising cutters and pairs of guide rails provided below said folding means, and said pairs of guide rails provided below said cutters and said slide means are adapted for pushing said separated containers between said pairs of guide rails to said final finishing device, and each pair of said guide rails has converging guide edges for partially folding down the end flaps against the apparatus.

15. The apparatus as claimed in claim 14, wherein said final finishing device has a plurality of individual finishing stations and is provided above and below the containers at a distance of the length of one container, and rollers, and endless belts passing thereover, and said rollers arranged in the transverse central plane of said individual finishing stations.

16. The apparatus as set forth in claim 15, wherein said individual finishing stations include a first, second, third and fourth finishing station of said final finishing device, the surface edges of said pairs of guide rails run parallel to one another, and said second finishing station includes pressing levers, base plates and pressure plates for pressing together the end flaps which project diagonally, said base plates supporting said end flaps and having a trapezoidal section, and said pressure plates are adapted to be pressable against said base plates by means of said pressing levers, and said third station including heated base plates adapted to support the end flaps by means of said heated base plates, and including channels which run transversely to the advance direction of the packet for applying adhesive material to the top and bottom of the packet standing in the station, and said fourth station including pressure plates is arranged for pressing the end flaps.

17. The apparatus as set forth in claim 16, further comprising means for connecting a plurality of containers to form a packet after said first and second stations, and said third station including third station pressure plates for pressing the end flaps onto the top and bottom, and said fourth station, including fourth station pivotable and heated pressure plates for gluing paper strips coated with plastics material to the end flaps, and further comprising a fifth station, including fifth finishing station pressure plates for pressing the strips onto the end flaps, and studded strips arranged on the side of the pressure plates for perforating the strips in the contact planes of the containers, and paper strip cutters at the end of said final finishing device for cutting through the paper strips at the end of each packet.

18. The apparatus as set forth in claim 17, wherein said pressure plate provided in the second station cooperating with the end flaps having the welded surface, includes cutting knive means for producing notches for the tear-off opening.

References Cited

UNITED STATES PATENTS

| 2,362,460 | 11/1944 | Barnett | 53—28 X |
| 3,041,941 | 7/1962 | Danielzig | 53—29 X |
| 3,335,540 | 8/1967 | Reil et al. | 53—28 |

THERON E. CONDON, Primary Examiner

E. F. DESMOND, Assistant Examiner

U.S. Cl. X.R.

93—20